United States Patent
Mazik et al.

(10) Patent No.: US 12,152,800 B2
(45) Date of Patent: Nov. 26, 2024

(54) HEAT RECOVERY VENTILATION UNIT

(71) Applicants: RECUAIR, S.R.O., Kralupy nad Vltavou (CZ); CESKE VYSOKE UCENI TECHNICKE V PRAZE, Prague (CZ)

(72) Inventors: Juraj Mazik, Prague (CZ); Vladimir Zmrhal, Odolena Voda (CZ)

(73) Assignees: RECUAIR, S.R.O., Kralupy nad Vltavou (CZ); CESKE VYSOKE UCENI TECHNICKE V PRAZE, Prague (CZ)

( * ) Notice: Subject to any disclaimer, the term of this patent is extended or adjusted under 35 U.S.C. 154(b) by 0 days.

(21) Appl. No.: 17/754,567

(22) PCT Filed: Oct. 4, 2020

(86) PCT No.: PCT/CZ2020/050073
§ 371 (c)(1),
(2) Date: Apr. 6, 2022

(87) PCT Pub. No.: WO2021/068996
PCT Pub. Date: Apr. 15, 2021

(65) Prior Publication Data
US 2024/0060676 A1    Feb. 22, 2024

(30) Foreign Application Priority Data
Oct. 6, 2019 (CZ) .................. CZ2019-621

(51) Int. Cl.
*F24F 12/00*    (2006.01)
*F24F 7/08*    (2006.01)
(Continued)

(52) U.S. Cl.
CPC ............. *F24F 12/006* (2013.01); *F24F 7/08* (2013.01); *F24F 11/41* (2018.01); *F24F 13/222* (2013.01);
(Continued)

(58) Field of Classification Search
CPC ........ F24F 12/001; F24F 12/006; F24F 11/41; F24F 7/08; F24F 7/013; F24F 13/222;
(Continued)

(56) References Cited

U.S. PATENT DOCUMENTS

| 6,209,622 B1 | 4/2001 | Lagace |
| 10,212,914 B1 * | 2/2019 | Reynolds ............... F24F 13/32 |
| 2009/0133851 A1 | 5/2009 | Caldwell |

FOREIGN PATENT DOCUMENTS

| CN | 208011989 U | 10/2018 |
| CZ | 31824 U | 6/2018 |

(Continued)

*Primary Examiner* — Joseph F Trpisovsky
(74) *Attorney, Agent, or Firm* — Riverside Law LLP

(57) ABSTRACT

A ventilation unit with heat recovery, comprising a first block having an air interconnection to the interior of the building, a third block having an air interconnection to the exterior of the building and a second block located between them, in which the heat recovery exchanger is located, with at least one first channel and at least one second channel. The second block is insertable between the first block and the third block in such manner that the first channels are airtightly connectable to the first block and to the third block. The second channels are airtightly connectable to the first block, different from the air duct to which the first channels are connectable, and the second channels are also airtightly connectable to one of the air ducts of the third block, different from the air duct to which the first channels are connectable.

9 Claims, 7 Drawing Sheets

(51) Int. Cl.
*F24F 11/41* (2018.01)
*F24F 13/22* (2006.01)
*F24F 7/00* (2021.01)

(52) U.S. Cl.
CPC . *F24F 2007/0025* (2021.01); *F24F 2012/008* (2013.01)

(58) Field of Classification Search
CPC ......... F24F 2007/0025; F24F 2012/008; F24F 13/30; F24F 2221/17
See application file for complete search history.

(56) References Cited

FOREIGN PATENT DOCUMENTS

| | | | | |
|---|---|---|---|---|
| DE | 3130265 | 2/1983 | | |
| EP | 2461127 A2 | * 6/2012 | ............ | F24F 12/006 |
| EP | 3330626 | 6/2018 | | |
| GB | 2095752 | 10/1982 | | |
| GB | 2237869 | 5/1991 | | |
| JP | S6082734 | 5/1985 | | |
| KR | 2013112378 A | * 10/2013 | | |
| KR | 20190079032 | 7/2019 | | |

\* cited by examiner

Airtight connection

Deatil C2 disconnected

Deatil C2 connected

Detail J
Condensate drainage

HEAT RECOVERY VENTILATION UNIT

CROSS-REFERENCE TO RELATED APPLICATIONS

This application is a U.S. national phase application filed under 35 U.S.C. § 371 claiming priority to International Patent Application No. PCT/CZ2020/050073, filed Oct. 4, 2020, which is entitled to priority to Czech Republic Patent Application No. CZ2019-621A, filed Oct. 6, 2019, the contents of each of which are incorporated by reference herein in their entireties.

TECHNICAL FIELD

The present invention relates to a device for ventilation of buildings, with a counterflow heat recovery exchanger for heat recovery and is intended for use in a variety of climactic conditions.

BACKGROUND

In the field of heat recovery from exhaust air, a number of devices are available on the market operating on the principle of heat recovery or regeneration. Heat recovery exchangers share heat through a heat exchange surface (plate exchangers), while regenerative exchangers use storage mass that either rotates around its axis (rotary exchangers) and exhaust and fresh air pass alternately through the storage mass, or there are two storage masses and the air flow changes through both masses (alternating flow exchangers).

Heat recovery exchangers can be of different construction design according to the climatic conditions for which they are intended. Ventilation units with a heat recovery exchanger designed for warmer climates as well as ventilation units with a heat recovery exchanger intended for areas where it freezes are known in prior art. However, no ventilation units are known which, within the same unit body, would allow to easily change the type of heat recovery exchanger by simply inserting it between other parts of the ventilation unit while ensuring an airtight connection between the air ducts between the exchanger and other parts of the unit. Therefore, according to the solutions known from prior art, complete ventilation units intended for warmer climate regions and complete ventilation units designed in another manner intended for colder climate regions are produced, which makes them difficult to manufacture. A ventilation unit with a heat recovery exchanger without frost protection in the form of preheating of the fresh air supply, which would allow a simple insertion of a block of a suitable type of recovery exchanger among the other standardized parts of the ventilation unit, depending on the climatic region, is not known from the prior art.

For heat recovery exchangers designed for cold climatic conditions, it is necessary to prevent their freezing and therefore they have a more complex construction design. Icing occurs on the side of the extract air (interior), which is moist and condenses on the walls of the exchanger. If exterior air is drawn in at sub-zero temperatures, icing may occur, which reduces the overall energy contribution of the device, or the channels may be completely clogged. In regenerative heat exchangers, this phenomenon is eliminated by their own construction and principle. To prevent icing or defrosting of heat recovery exchangers, the following measures are used:

a) pre-heating of the exterior air,
b) use of the extract air for defrosting,
c) alternating of air flow between the supply and extract part of the exchanger.

More detailed information on the various methods of defrosting heat recovery exchangers according to prior art can be found in the documents cited below.

The device according to WO 03/085327 A1 uses for heat recovery a counterflow recuperation exchanger which does not change its position. To prevent icing, principle c) is used, with defrosting occurring by switching the direction of the air flow through the supply and extract parts of the exchanger. The disadvantage of this solution is the considerable complexity of the solution in the form of mutual coordination of the damper system. Damper systems are technically very demanding, and both their implementation and manufacture are very difficult. In addition, they are dimensionally demanding, which virtually precludes their application in minimizing small heat recovery ventilation units. They can be used for units with larger dimensions, where the appropriate damper system can be integrated.

The heat recovery device according to U.S. Pat. No. 4,391,321 uses an exchanger that does not change its position. A damper system is used to switch the air flow. The disadvantage of such a solution is that the exchanger attains considerable dimensions and contains a damper system, which is technically very demanding and its implementation and production itself is very difficult.

The device according to document US 2009/0133851 A1 comprises an integrated convector for defrosting the heat recovery exchanger without creating lower pressure in the ventilated rooms using the circulation of the circulating air from the room. During defrosting, the dampers on the fresh air intake and on the exhaust are automatically closed and only circulating air is conveyed through the exchanger. The disadvantage of such a solution is the fact that there is no ventilation (fresh air supply) during the defrosting cycle. In principle, this is defrosting method of type b).

The device according to document US 2009/0128556 A1 is characterized in that it comprises dampers which, in the event of icing, ensure the flow of circulating, internal air through the heat recovery exchanger. During defrosting, the dampers on fresh air intake and on the exhaust are automatically closed and only circulating air is conveyed through the exchanger. The disadvantage of such a solution is the fact that there is no ventilation (fresh air supply) during the defrost cycle. In principle, this is a defrosting method of type b).

The device according to the utility model CZ 25771 U1 solves an air-conditioning heat recovery unit with microwave frost protection, the principle of which is the installation of a microwave diffuser near the heat recovery exchanger. The microwave source produces electromagnetic waves with a frequency of 2450 MHz. The disadvantage of such a solution is the need to install an additional component. This component requires increased space and also increases the cost of the entire device. It can be used for larger units where an additional component can be installed.

The device according to the utility model CZ 31824 U1, the owner and originator of which is one of the co-inventors of the present invention, solves an air-conditioning ventilation unit with a counterflow heat exchanger adapted for its defrosting on a general level. The unit comprises a counterflow heat exchanger with channels, which is rotatably mounted in the air-conditioning unit, the air-conditioning unit being provided with a drive for rotating the heat exchanger to ensure alternating flow of exhaust air and fresh air supply through the individual channels of the exchanger.

At the time of filing the utility model application, however, many other innovative features were not known, which take the solution with a rotary heat exchanger to the next level and expand the possibilities of its use. The utility model CZ 31824 U1 does not yet consider the possibility of versatile mounting of the counterflow heat recovery exchanger in a manner making it possible to easily change the exchangers for different climatic regions so that the same ventilation unit can be equipped with either a rotary exchanger for cold climate, or a fixed exchanger for a warm climate. In CZ 31824 U1, the connection of the heat recovery exchanger to the other parts of the ventilation unit is not solved at all. Neither the arrangement of those parts of the exchanger allowing its easy rotation in the version for colder climates is solved, nor the drive and control of the exchanger rotation in this embodiment. Furthermore, CZ 31824 U1 does not solve the problem of heat loss of the exchanger, condensate drainage, which represents a technical problem when rotating the exchanger, air intake and exhaust, placement of fans and piping routing, and placement of the drive to minimize acoustic effects.

SUMMARY OF THE INVENTION

These disadvantages are eliminated by the heat recovery ventilation unit according to the present invention, which has a special second block comprising a heat recovery exchanger, this second block being insertable among the other parts of the ventilation unit. In the same ventilation unit, it is also possible to use both the second block in a fixed embodiment intended for warmer climates and the second rotating block intended for colder regions. In the rotating version, it is possible to alternately change the position of the extract and supply parts of the heat recovery exchanger and thus prevent icing and effectively use heat recovery even in cold climate regions throughout the year. Defrosting of the heat recovery exchanger can be effectively controlled according to current conditions.

The heat recovery ventilation unit according to the present invention is intended for ventilation of a building having at least one external wall. This ventilation unit comprises a first block having an air interconnection to the interior of the building, a third block having an air interconnection to the exterior of the building and a second block located between these two blocks, in which a heat recovery exchanger, mechanically connected to this second block, is located. The heat recovery exchanger comprises at least one first channel and at least one second channel, wherein the first channels are in thermal contact with the second channels. In the third block, for air interconnection to the exterior of the building, there is an intake air duct for conveying fresh air from the exterior to the second block and also an exhaust air duct for the removal of waste air from the second block to the exterior. In the first block, for air interconnection to the interior of the building, there is a supply air duct for conveying fresh air from the second block to the interior and also an extract air duct for conveying waste air from the interior to the second block. The principle of the invention is that the second block is insertable between the first block and the third block so that the first channels by their first ends are airtightly connectable to one of the air ducts of the first block, and by their second ends they are airtightly connectable to one of the air ducts of the third block. Furthermore, also the second channels are airtightly connectable by their first ends to one of the air ducts of the first block, different from the air duct to which the first ends of the first channels are connectable, and by their second ends the second channels are airtightly connectable to one of the air ducts of the third block different from the air duct to which the second ends of the first channels are connectable.

In the advantageous embodiment, the first block is provided with a first contact surface on its side facing the second block and similarly the third block is provided with a third contact surface on its side facing the second block. In this embodiment, the second block is provided with a second left contact surface on its side facing the first block and a second right contact surface on its side facing the third block. All contact surfaces are airtight and each has at least two openings inside, the first ends of the first channels being air interconnected to one of the openings or one group of openings in the second left contact surface and the first ends of the second channels being air interconnected to another opening or another group of openings in the second left contact surface, other than the first channels. Further, the second ends of the first channels are air interconnected to one of the openings or one group of openings in the second right contact surface and the second ends of the second channels are air interconnected to another opening or group of openings in the second right contact surface, other than the first channels. Simultaneously, at least one contact surface of the pair first contact surface, second left contact surface is supported on its side facing the inward of the block of which it is a part by a pad of flexible airtight material and similarly at least one contact surface of the pair second right contact surface, third contact surface is on its side facing the inward of the block of which it is a part supported by a pad made of flexible airtight material. The first contact surface and the second left contact surface are of such shape and can be applied and pressed together at the interface of the first block and the second block in such manner that on the first interface of the first and second block at least two pairs of openings are connected in an airtight manner for the passage of at least two air streams through this first interface. Similarly, the second right contact surface and the third contact surface are of such shape and can be applied and pressed together at the second interface of the second block and the third block in such manner that least two pairs of openings are airtightly connected for the passage of at least two air streams through this interface.

The ventilation unit with an advantage further comprises a servo actuator for rotating the second block, including the heat recovery exchanger, relative to the first block and relative to the third block. This servo actuator is connected to the second block, whereas the rotation of the second block by means of the servo actuator is adjustable to a first position in which the first channels are interconnected by their second ends to the intake air duct and by their first ends to the supply air duct and the second channels are interconnected by their second ends to the exhaust air duct and by their first ends to the extract air duct. The rotation of the second block is also adjustable to a second position, in which the second channels are interconnected by their second ends to the intake air duct and by their first ends to the supply air duct and in which the first channels are interconnected by their second ends to the exhaust air duct and by their first ends to the extract air duct.

The actuator can be located in the third block or in the first block.

In one advantageous embodiment, the contact surfaces are slidable and have such shape that when the second block is rotated to the first position and also to the second position, at the first interface there is an airtight connection between the first block and the second block of at least two pairs of openings for separate flow of at least two air streams through this first interface and also simultaneously at the second interface between the second block and the third block there is an airtight connection between at least two pairs of openings for separate flow of at least two air streams through this second interface.

The ventilation unit further advantageously comprises a split condensate collector for draining condensed moisture from the exchanger, whereas this split condensate collector comprises an upper collecting part with an upper inlet and an upper outlet and a lower collecting part with a lower inlet and a lower outlet. The upper collecting part is part of the second block and is rotatable together with it. The lower collecting part is located outside the second block so that at one of the positions of the second block the lower inlet of the lower collecting part is below the upper outlet of the upper collecting part and also so that the lower outlet of the lower collecting part is connected to the condensate drain hose.

The ventilation unit further advantageously comprises a control unit for controlling the servo actuator and at least one interior temperature and/or humidity sensor located in the air ducts of the first block and it also comprises at least one exterior temperature and/or humidity sensor located in the air ducts of the third block. The interior sensors, the exterior sensors and the servo actuator are interconnected with the control unit.

The ventilation unit is advantageously shaped for being anchored in an installation hole penetrating into the outer wall of the building.

The second block, in an advantageous embodiment, is cylindrical and also the third block is advantageously cylindrical or comprises sections of cylindrical shape.

It is advantageous if the third block comprises a façade end element through which the air interconnection of the third block to the exterior of the building passes, whereas the façade end element comprises an airtight partition for directional separation of fresh and waste air and the transverse outer dimensions of this façade end element are smaller than the transverse dimensions of the installation opening penetrating the outer wall of the building for pushing the façade end element through this opening from the interior outwards. A flexible sealing sleeve is attached to the façade end element from the outside to seal and cover the gap between the façade end element and the installation opening, which is also part of the third block.

In an advantageous embodiment, the ventilation unit comprises LED lighting located in the first block.

The ventilation unit may also comprise at least one audio speaker located in the first block equipped with a wireless communication module.

BRIEF DESCRIPTION OF THE DRAWINGS

The invention is explained in more detail with reference to the drawings.

In FIG. 1 the main parts are marked, more details are provided in FIG. 2.

DESCRIPTION OF EMBODIMENTS

It is to be understood that the specific embodiments of the invention described and illustrated hereinbelow are presented for illustration and not to limit examples of the invention embodiments to the cases provided. Professionals skilled in the art will find, or will be able to ascertain using routine experimentation, a greater or lesser number of equivalents to the specific embodiments of the invention specifically described herein. These equivalents are also included within the scope of the following protection claims.

Figure 1:
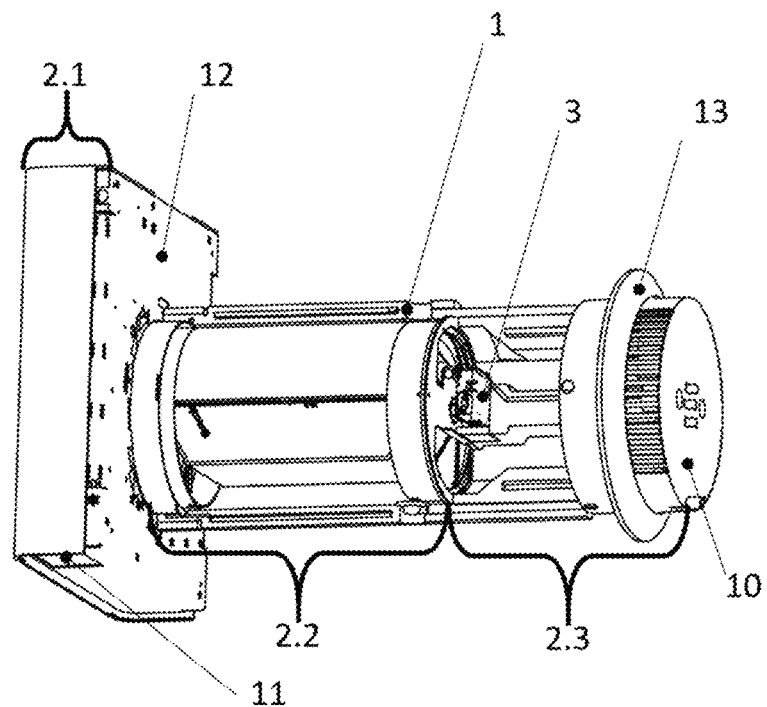
FIG. 1 and FIG. 2 show the overall assembly of the ventilation unit in a 3D view.
Figure 2:
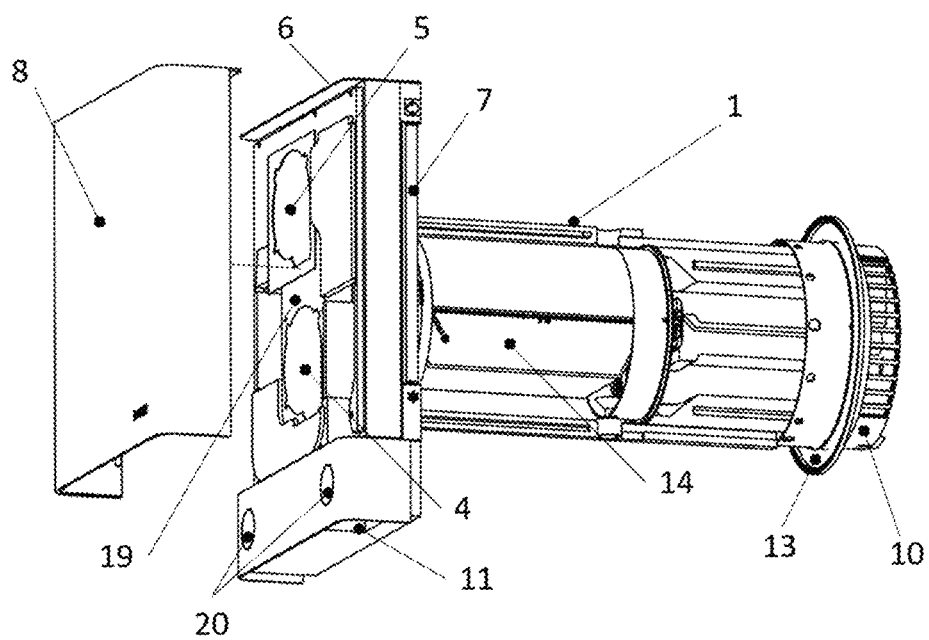
Figure 4:
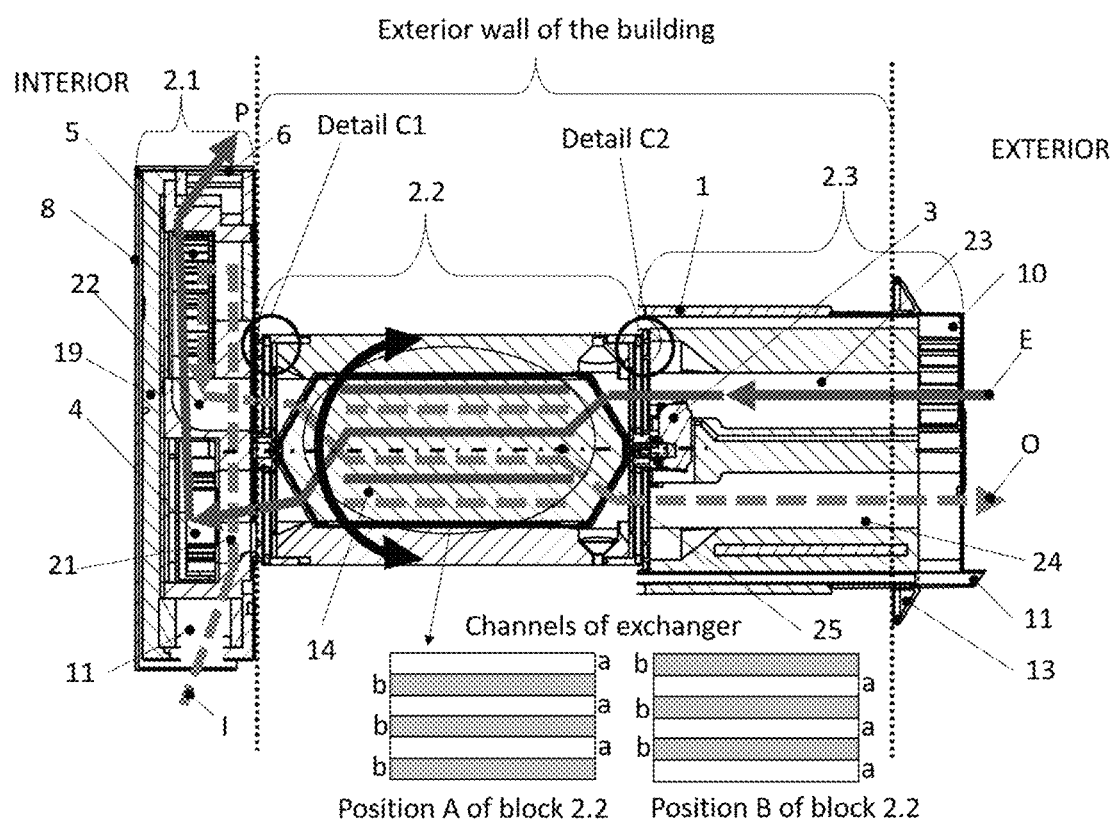
FIG. 4 is a longitudinal section of the ventilation unit with the indication of the air flow and the two positions of rotation of the second block 2.2. The location of the details, which are shown in more detail in FIG. 5 and in FIG. 6, is also indicated.

FIGS. 1, 2 and 4 show the overall assembly of the device in an advantageous embodiment with the main parts indicated. Displayed is the thermal insulation housing 1 of the unit, the so-called tube, which is advantageously connected to the third block 2.3 and in which the second block 2.2 is housed containing the heat recovery exchanger 14 for recovering heat from the exhaust air. The heat recovery exchanger 14 is mechanically connected to the second block 2.2.

The ventilation unit with heat recovery is intended for ventilation of a building having at least one external wall. The ventilated space can be, for example, an individual room inside a building, because the ventilation unit designed in this way is space-saving and can be installed individually in the exterior walls of individual rooms, whereas its arrangement is such that installation is possible also from the interior, as will be shown below.

FIGS. 1 and 4 also show that the ventilation unit further comprises the first block 2.1 having an air interconnection to the interior of the building and the third block 2.3 having an air interconnection to the exterior of the building, whereas the second block 2.2 with the heat recovery exchanger 14 for heat recovery is located between the two blocks, which is implemented as counterflow, and as shown in FIG. 4, comprises at least one first channel a and at least one second channel b, the channels a, b preferably being more numerous. The air flows through the first channels a in the opposite direction than in the second channels b. The arrangement of channels a, b may vary but it is important that the first channels a are in thermal contact with the second channels b along as much of their surface as possible.

In the third block 2.3, an intake air duct 23 is located for air interconnection to the exterior of the building to convey fresh air from the exterior to the second block 2.2 and also the exhaust air duct 24 for conveying the waste air from the second block 2.2 to the exterior. In the first block 2.1, a supply air duct 21 is located for air interconnection to the interior of the building for conveying fresh air from the second block 2.2 to the interior and also the extract air duct 22 for conveying waste air from the interior to the second block 2.2.

Into the interior of the ventilated building, air is conveyed by a supply fan 4, the removal of the waste air is ensured by the exhaust fan 5, see FIGS. 2, 4. It is not a condition that they are located in the first block 2.1, alternatively they can also be located in the third block 2.3. Both fans 4, 5 are advantageously housed in the internal insulating part 19, see FIG. 2, which at the same time performs a function in noise propagation and attenuation. This internal insulating part 19 is made of EPP material, i.e. expanded polypropylene, for protection against low exterior temperatures, which is also advantageous in terms of noise propagation and attenuation. On the internal insulating part 19 an internal unit cover 8 is mounted, performing the function of an interior element. With an advantage, the extract diffuser 11 for drawing waste air from the room, see FIG. 2, is mounted on an anchor plate 12, see FIG. 1. As can also be seen in FIG. 2, to the upper part of the internal insulating part 19 the supply diffuser 6 is connected, advantageously consisting of a series of nozzles ensuring sufficient reach of the supply air stream without the risk of generating noise. It is advantageous if the device can be remotely controlled.

The new and essential aspects of the present invention are that the second block 2.2 is insertable between the first block 2.1 and the third block 2.3 so that the first channels a are by their first ends, which are shown on the left in the exemplary embodiment in FIG. 4, airtightly connectable to one of the air ducts 21, 22 of the first block 2.1 and by their second ends, shown in FIG. 4 on the right, they are airtightly connectable to one of the air ducts 23, 24 of the third block 2.3. The second channels b are by their first ends, in the example according to FIG. 4, on the left, airtightly connectable to one of the air ducts 21, 22 of the first block 2.1 different from the air duct to which the first ends of the first channels a are connectable, and by their second ends, in FIG. 4 shown on the right, the second channels b are airtightly connectable to one of the air ducts 23, 24 of the third block 2.3, different from the air duct to which the second ends of the first channels a are connectable.

Figure 5:
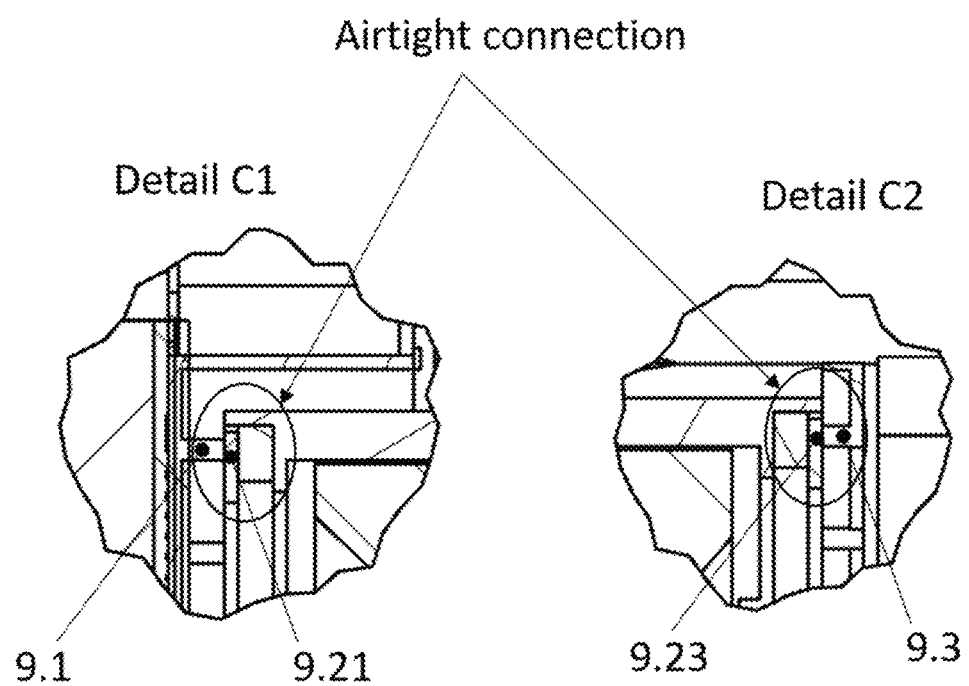
FIG. 5 also shows in a longitudinal section of the ventilation unit the details of the airtight connection between the first block 2.1 and the second block 2.2 (picture on the left, detail C1) and between the second block 2.2 and the third block 2.3 (picture on the right, detail C2).
Figure 6:
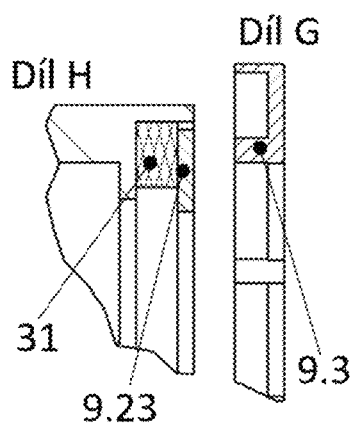
In FIG. 6, the detail C2 is then drawn in more detail. At top left, in the longitudinal section of the ventilation unit, detail C2 from the D-D section is drawn, parts before connecting blocks 2.2 and 2.3, at top right is detail C2 from section F-F, the same parts after their connection and pressing together. Position of the longitudinal section planes of sections D-D, F-F is marked in the lower part of FIG. 6 in cross-sections of the ventilation unit.
Figure 6:
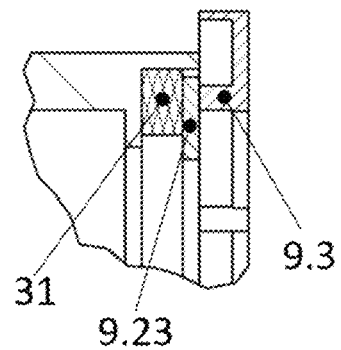
Figure 6:
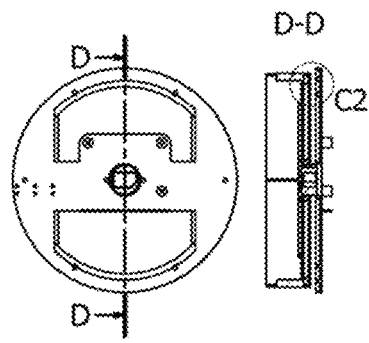
Figure 6:
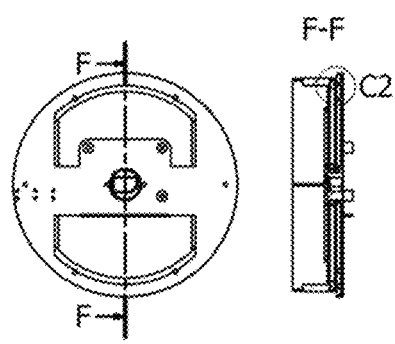
Figure 7:
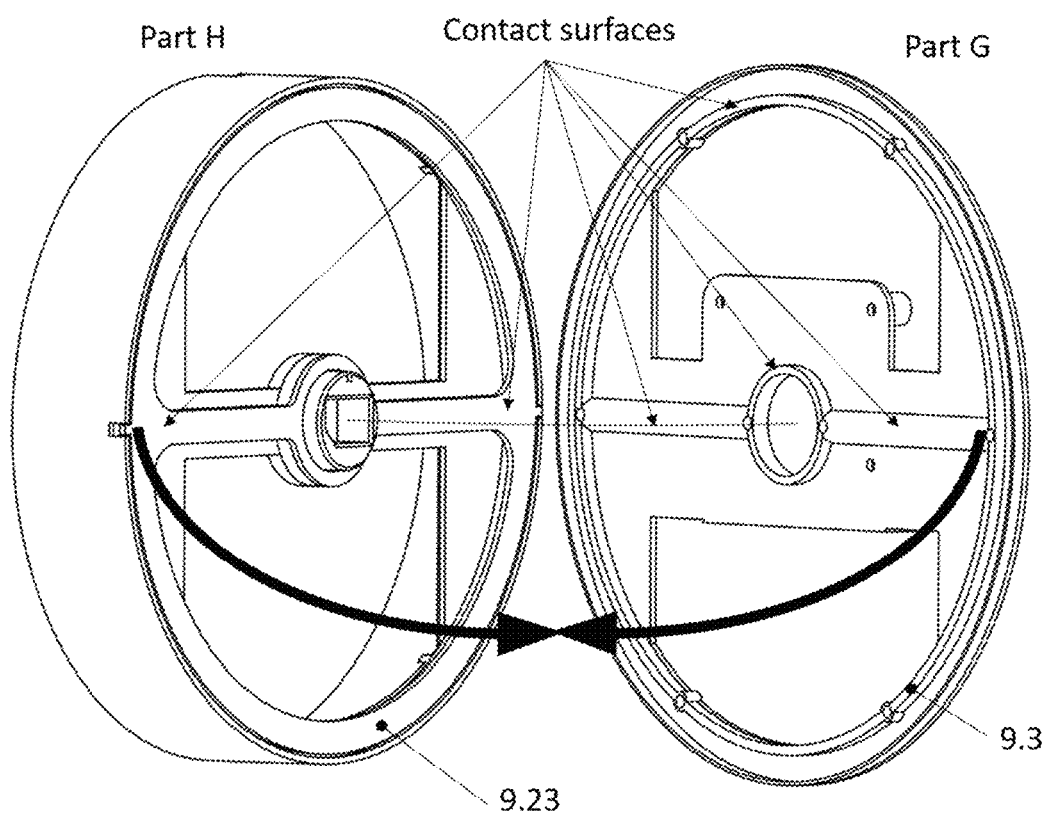
FIG. 7 is a 3D view of the end part of the blocks 2.2 and 2.3, the arrows indicate how the contact surfaces 9.3 and 9.23 interconnect after connecting the blocks.

The above-mentioned airtight connectivity of the channels a, b can be advantageously implemented in a manner described below and illustrated in more detail in FIGS. 3, 4 and then in detail in FIGS. 5, 6, 7. It can be seen that the first block 2.1 is provided on its side facing the second block 2.2 with a first contact surface 9.1 and similarly the third block 2.3 is provided on its side facing the second block 2.2 with a third contact surface 9.3. The second block 2.2 is provided on its side facing the first block 2.1 with a second left contact surface 9.21 and on its side facing the third block 2.3 with a second right contact surface 9.23. The terms right and left are chosen only with regard to the given exemplary illustration, the ventilation unit can, of course, be rotated in practice in any way. All contact surfaces 9.1, 9.21, 9.23, 9.3 are airtight and each one has at least two openings inside, as is best seen in FIG. 7, which shows the most typical embodiment with two openings in each of the contact surfaces 9.3, 9.23. In FIG. 7, only the contact surfaces on blocks 2.2 and 2.3 are shown, but a similar arrangement is also on the other side between the blocks 2.1, 2.2 for the contact surfaces 9.1, 9.21. In FIG. 6, only the most advantageous embodiment of detail C2 from FIGS. 4, 5 is shown in detail. The detail C1 would look similar in shape, only mirror-inverted.

Within the second block 2.2, the first ends of the first channels a are air interconnected to one of the openings or group of openings in the second left contact surface 9.21 and the first ends of the second channels b are air interconnected to an opening or group of openings in the second left contact surface 9.21, other than first channels a. Further, the second ends of the first channels a are air interconnected to one opening or one group of openings in the second right contact surface 9.23 and the second ends of the second channels b are air interconnected to an opening or a group of openings in the second right contact surface 9.23, other than the first channels a. Contacting and pressing together the contact surfaces 9.1 and 9.21 guarantees the connection of the first channels a to a different air duct of the first block 2.1 than the one to which the second channels b are connected, and similarly, after contacting and pressing together surfaces 9.23 and 9.3, see detail in FIG. 6 and 3D illustration in FIG. 7, the connection of the first channels a to a different air duct in the third block 2.3, other than to which the second channels b are connected, is ensured.

In detail in FIG. 6 it can be further seen that the second right contact surface 9.23 is supported by a pad 31 of flexible airtight material on its side facing the inward of the second block 2.2. Alternatively, however, an embodiment is also possible in which the flexible airtight material pad 31 is provided on the third contact surface 9.3 on its side facing the inward of the third block 2.3. This is essential to ensure an airtight connection of channels a, b to the corresponding air ducts in the third block 2.3 at the interface between blocks 2.2 and 2.3.

A situation corresponding to FIG. 6 could be illustrated analogously also for the first interface between blocks 2.1 and 2.2, which is also in the advantageous embodiment provided with at least one flexible airtight material pad 31, and it does not matter under which of the contact surfaces 9.1, 9.21 this pad 31 is located. The pad 31 is always placed inwards into that of the blocks 2.1, 2.2, 2.3 of which it is a part, so as not to prevent direct contact of the first contact surface 9.1 with the second left contact surface 9.21, direct contact of the second right contact surface 9.23 with the third contact surface 9.3.

In some cases, it is advantageous if the pad 31 is rigidly connected to the contact surface to which it adjoins. In the case of the pad 31 under the second left contact surface 9.21 and the rotary block 2.2, see below, pad 31 then rotates together with this left contact surface 9.21, similarly in the case of the pad 31 positioned under the second right contact surface 9.23, pad 31 rotates together with this the second right contact surface 9.23.

It holds, that at least one contact surface of the pair of first contact surface 9.1, second left contact surface 9.21 is supported on its side facing the inward of the block of which it is a part by the pad 31 of flexible airtight material and similarly at least one contact surface of the pair of second right contact surface 9.23, third contact surface 9.3 is supported on its side facing the inward of the block of which it is a part by the pad 31 of flexible airtight material. The first contact surface 9.1 and the second left contact surface 9.21 are of such shape and can applied and pressed together at the interface of the first block 2.1 and the second block 2.2 in such manner that at the first interface of the first block 2.1 and the second block 2.2, at least two pairs of openings are airtightly connected to each other for the passage of at least two air streams separated in an airtight manner through this first interface. Similarly, the second right contact surface 9.23 and the third contact surface 9.3 are of such shape and can applied and pressed together at the second interface of the second block 2.2 and the third block 2.2 in such manner that at least two pairs of openings are airtightly connected to each other for the passage of at least two air streams separated in an airtight manner through this interface. E.g. after joining parts G and H shown in FIG. 7 according to the arrows, through the interface between blocks 2.2 and 2.3, 2 air streams would flow, one stream through the connection of the upper pair of openings in contact surfaces 9.3, 9.23, the second stream through the connection of the lower pair of openings in contact surfaces 9.3, 9.23.

Figure 3:
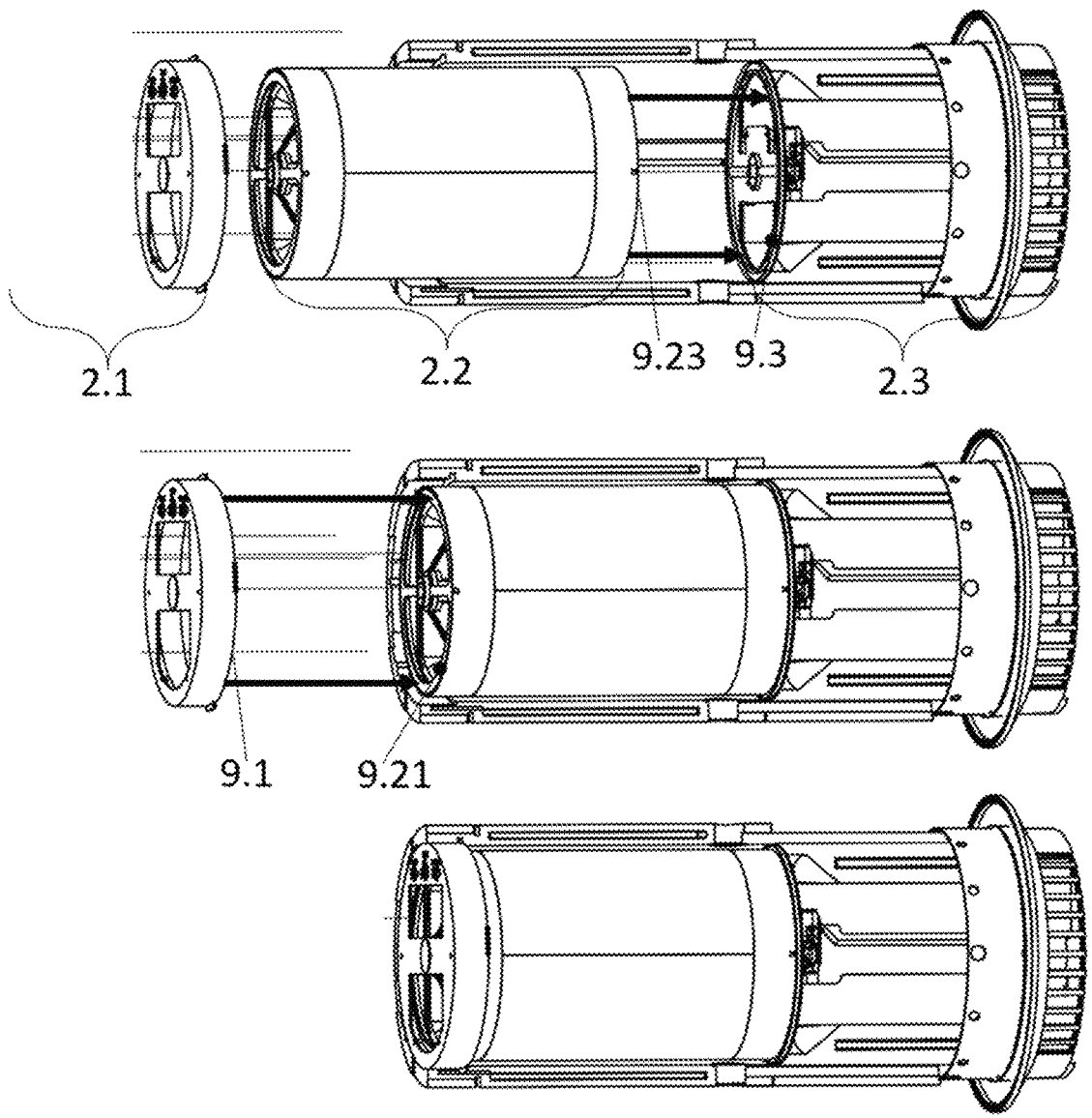
FIG. 3 shows the process of inserting the second block 2.2 between the first block 2.1 and the third block 2.2.

Airtightness of this connection in this advantageous embodiment is achieved by the flexibility of the airtight material of pads 31, which are pressed against their opposite parts when assembling the ventilation unit, e.g. as shown in FIG. 3, thus ensuring airtightness and better axial alignment of blocks 2.1, 2.2 and 2.3.

FIG. 3 shows how the ventilation unit is assembled by pressing the second block 2.2 to the third block 2.3 and subsequently by pressing the first block 2.1 to the second block 2.2. Therefore, in a ventilation unit with standardized blocks 2.1 and 2.3, it is possible to alternate different types of central second blocks 2.2 without further structural modifications, which is particularly important and practical in the production of ventilation units intended for different climatic regions. For planned use in areas with winter temperatures below freezing, at least one of the standardized blocks 2.1, 2.3 should be provided with space for housing the servo actuator 3.

In the embodiment intended for the colder climate regions, the ventilation unit further comprises a servo actuator 3 for rotating the second block 2.2, including the heat recovery exchanger 14, relative to the first block 2.1 and relative to the third block 2.3. This servo actuator 3 is connected to the second block 2.2, as shown, for example, in FIG. 4 or FIG. 8. The rotation of the second block 2.2 by means of the servo actuator 3 is adjustable to the first position A, in which the first channels a are interconnected by their second ends to the intake air duct 23 and by their first ends to the supply air duct 21, and in which the second channels b are interconnected by their second ends to the exhaust air duct 24 and by their first ends to the extract air duct 22. The rotation of the second block 2.2 is adjustable also to the second position B, in which the second channels b are interconnected by their second ends to the intake air duct 23 and by their first ends to the supply air duct 21 and in which the first channels a are interconnected by their second ends to the exhaust air duct 24 and by their first ends to the extract air duct 22. This is best seen in FIG. 4, where the positions of the channels a, b at positions A, B are shown in detail at the bottom of the figure. The upper part of the figure shows the air flow through the channels and air ducts. The solid line with an arrow indicates the flow of fresh air from the clean air inlet E from the exterior to the clean air inlet P into the interior. In the first position A of the second block 2.2 this fresh air flows through the first channels a, in the second position B of the second block 2.2 this fresh air flows through the second channels b.

The dashed line with an arrow indicates the flow of waste air from waste air outlet I from the interior to waste air outlet O to the exterior. In the first position A of the second block 2.2, the waste air flows through the second channels b, in the second position B of the second block 2.2, this waste air flows through the first channels a.

The coupling of the servo actuator 3 and the anchoring of the second block 2.2 with the exchanger 14 are designed and shaped so that the second block 2.2 can be freely slid onto the coupling only in the required position. The loose slide is suitable for an easy removal of the block 2.2 for maintenance of the exchanger 14 and at the same time the loose fit allows small axial movement of the second block 2.2 during rotation and thus better sealing of the sealing joints at the first interface of blocks 2.1, 2.2 and at the second interface of blocks 2.2 and 2.3.

FIG. 4 also shows the rotation axis 25 of the second block 2.2.

The principle of operation of the heat recovery exchanger 14 in the rotary embodiment is as follows: In the first position A, the recuperation exchanger 14 receives air drawn from the clean air inlet E from the exterior, which passes through the heat recovery exchanger 14, where it is conditioned, i.e. especially heated and humidified, and thus conveyed to the inlet P of clean air into the interior. Warm indoor waste air is then extracted from the interior via the waste air outlet I from the interior, passing though the exchanger while transferring its heat and moisture, to the exterior environment via the waste air outlet O. After certain time interval, which is precisely determined with respect to the formation of condensate and/or icing, the exchanger starts to rotate, see arrows in FIG. 4. The final position of the exchanger is a 180° rotation to the second position B, whereby the initially supply part of the exchanger moves to the extract part and vice versa, the originally extract part is now the supply part. Now fresh exterior air flows through it, which is heated and humidified at the same time. After a given time interval, as preselected, or based on data from sensors, the exchanger starts to rotate back again by 180° to its original first position A. This process is repeated cyclically. The advantage of this arrangement is the prevention of icing on the exchanger in the extract part through which warm and humid air flows. It is advantageous if the supplied exterior air, which is dry in winter, is humidified by the condensate which forms in the extract part of the exchanger. It is also advantageous if the device does not have to be connected to a condensate drain, which is problematic for local ventilation units. In the embodiment according to the present invention, the condensed moisture can be after the rotation of the second block 2.2 advantageously used to humidify the fresh air supplied to the interior. This arrangement is advantageous especially due to the year-round balance of utilizing the heat recovery potential from the waste air. The design of the unit ensures its energy efficiency with regard to preventing icing of the heat recovery exchanger, without high demands on energy consumption.

The rotation capability of the second block 2.2 according to the above-mentioned advantageous embodiment makes it possible to vary the flow of fresh and waste air through the heat recovery exchanger 14 without a complicated damper system which is known from the prior art. Due to this, it is also possible to have the second block 2.2 in an identical shape in the static design for warmer climates, where deicing is not necessary, and in the rotating design for colder climates, where deicing is necessary, which would not be possible without demanding modifications in a version with a damper exchanger. The type of the second block 2.2 for colder climates in a rotating arrangement is then easily exchangeable with the type of the second block 2.2 for warmer climates, e.g. in the manner according to FIG. 3, thus allowing to manufacture most components of the ventilation unit in a standardized way and adjust only the middle second block 2.2 based on the particular climate. The servo actuator 3 can be located in the third block 2.3, which is more suitable for acoustic reasons, or in the first block 2.1.

For the rotating embodiment of block 2.2 with servo actuator 3, it is advantageous if the contact surfaces 9.1,

9.21, 9.23, 9.3 are slidable so that those pairs of contact surfaces which are in contact with each other after assembling the ventilation unit can slide against each other as smoothly as possible. Contact surfaces 9.1, 9.21, 9.23, 9.3 are shaped in such a way that when the second block 2.2 is rotated to the first position A and also when the second block 2.2 is rotated to the second position B, at the first interface between the first block 2.1 and the second block 2.2, there is an airtight connection of at least two pairs of openings for separate flow of at least two air streams through this first interface and at the same time at the second interface between the second block 2.2 and the third block 2.3 there is an airtight connection of at least two pairs of openings for separate flow of at least two air streams through this second interface.

Figure 8:
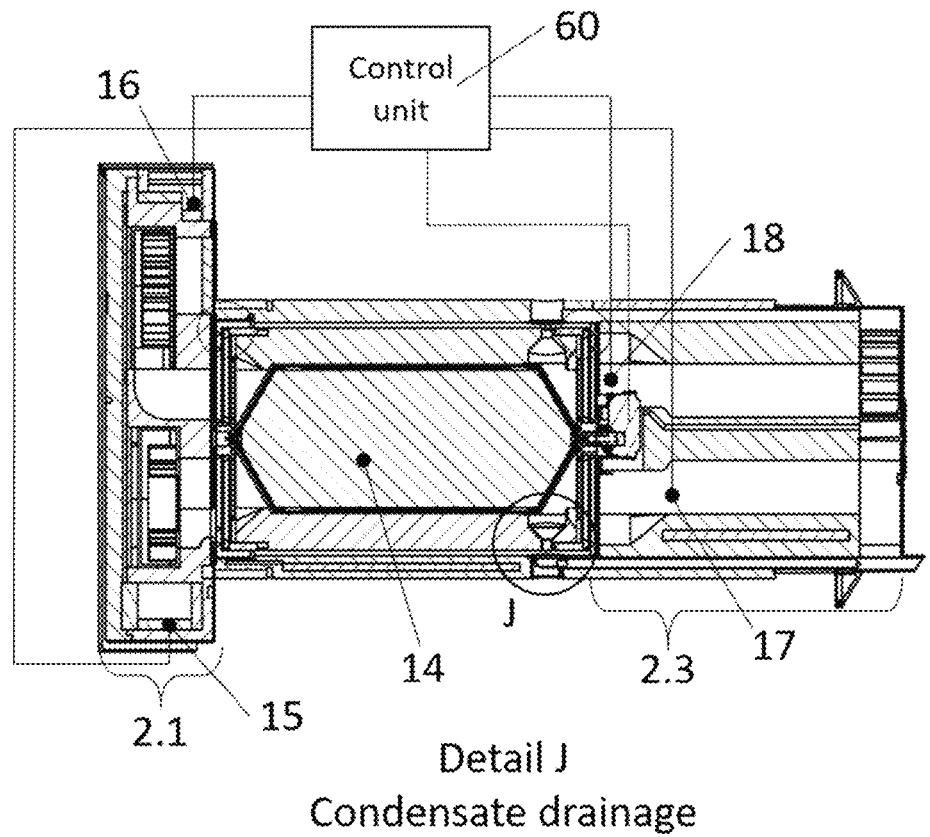
FIG. 8 shows a longitudinal section of the ventilation unit indicating some parts not shown in FIG. 4. A sensor system with a control unit, the rest of the thermal insulation housing of the unit and a condensate drainage device are shown, which is then provided in detail J in the lower part of the picture.
Figure 8:
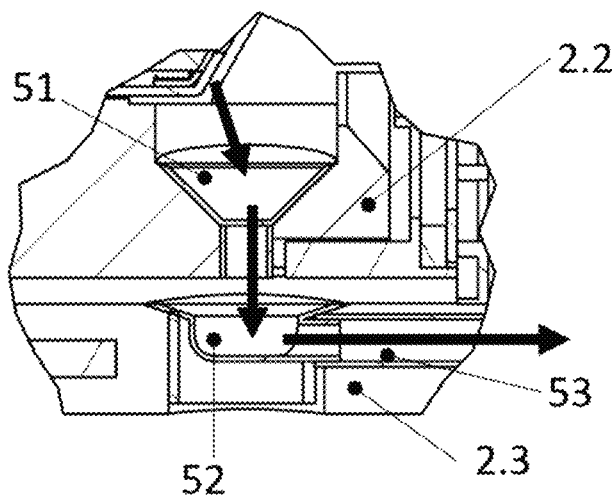

A situation may occur where the condensate formed is not sufficient to humidify the fresh air supplied to the interior. For this case, the ventilation unit may further comprise a condensate collector for removing condensed moisture from the exchanger. In the rotary embodiment of the second block 2.2, this condensate collector is designed as a split collector, which is shown in FIG. 8 and especially in detail J. This split condensate collector comprises an upper collecting part 51 with an upper inlet and upper outlet and a lower collecting part 52 with a lower inlet and lower outlet. The upper collecting part 51 is part of the second block 2.2 and is rotatable with it and the lower collecting part 52 is located outside the second block 2.2 so that at one of the positions A, B of the second block 2.2 the lower inlet neck of the lower collecting part 52 is below the upper outlet of the upper collecting part 51 and also such that the lower outlet of the lower collecting part 52 is connected to the condensate drain hose 53.

FIG. 8 also shows other parts of the ventilation unit important in particular for the rotary design of the second block 2.2, namely the control unit 60 for controlling the servo actuator 3, interior temperature and/or humidity of the extract waste air sensor 15, interior temperature and/or humidity of the supply fresh air sensor 16, exterior temperature and/or humidity sensor 17 of the exhaust waste air, and exterior temperature and/or humidity sensor 18 of the intake fresh air. The interior sensors 15, 16 are located in the air ducts 21, 22 of the first block 2.1 and it is important that at least one of them is installed. Similarly, the exterior sensors 17, 18 are located in the air ducts 23, 24 of the third block 2.3 and it is important that at least one of them is installed. The interior sensors 15, 16, the exterior sensors 17, 18 and the servo actuator 3 are connected to the control unit 60.

The control unit 60 on the basis of data from sensors 16, 17, 18, 19, or in one advantageous embodiment only on the basis of data from sensors 15 and 18, or in one advantageous embodiment only on the basis of data from sensor 18 measuring temperature and/or humidity values, evaluates the condition of the air in the individual streams and determines the time interval between the individual rotations of the second block 2.2.

If the ventilation unit is equipped with sensors for measuring temperature and humidity, the control unit 60 can, in the event of excessive interior humidity and suitable conditions, stop the rotation and thus prevent the return of moisture condensed from the waste exhaust air, and supply only the relatively drier exterior air for reducing humidity in the interior. To achieve greater compactness, control unit 60 is advantageously located inside one of the blocks 2.1, 2.2, 2.3 of the ventilation unit, see the embodiment according to FIG. 2, but can also be located outside it, see the embodiment according to FIG. 8, where a wiring diagram is shown relating to any location of the control unit 60, as well as its possible location outside blocks 2.1, 2.2, 2.3.

The ventilation unit is shaped to be anchored in the installation opening penetrating the exterior wall of the building. It is advantageous if a thermally insulating material is used for the thermal insulating housing 1 of the unit for installation in the outer wall, which prevents heat transfer from or to the material of the peripheral wall.

It is advantageous if the second block 2.2 is cylindrical and if also the third block 2.3 is cylindrical or comprises sections of cylindrical shape. Due to this shape arrangement, the space is better used, both the space for thermal insulation and also the space for the heat exchange surface of the exchanger.

For the possibility of installing the ventilation unit from the interior, the third block 2.3 comprises a façade end element 10, through which passes the air interconnection of the third block 2.3 to the exterior of the building. The façade end element 10 comprises an airtight partition for the directional separation of fresh and waste air, and the transverse outer dimensions of this façade end element 10 are smaller than the transverse dimensions of the installation opening penetrating the outer wall of the building. Due to this, it is possible to slide the façade end element 10 through this opening in the direction from the interior, i.e. in contrast to the solutions known from prior art, wherein it is necessary to install the façade element from the exterior, work at height is not necessary. Attached to the façade end element 10 from the outside is a flexible sealing sleeve 13 for sealing and covering the gap between the façade end element 10 and the installation opening, which is also part of the third block 2.3, see FIG. 4.

The procedure for installing the ventilation unit in the installation opening is such that the thermal insulation housing 1 is together with the third block 2.3, the façade end element 10 and the flexible sealing sleeve 13 pushed into the prepared opening in the outer wall. The subsequent procedure also includes the insertion of the second block 2.2 and the first block 2.1, which can also be inserted in parts. The second block 2.2 can also be inserted simultaneously with the third block 2.3. An advantageous arrangement includes such flexible sealing sleeve 13 which allows the passage through the opening in the outer wall. After passing through the outer wall, the flexible sealing sleeve 13 straightens and the façade end element 10 can be pressed against the outer wall by pulling back.

The ventilation unit may further comprise a LED illumination 7 located in the first block 2.1, see FIG. 2. The LED illumination 7 is preferably of the RGB type for the possibility of backlighting the ventilation unit with mood colour or backlighting a picture hanging on the unit. The device is further designed so that it can be covered by hanging the picture over the decorative internal unit cover 8, which allows the ventilation unit to be discreetly hidden in the interior.

The ventilation unit may also comprise at least one audio loudspeaker 20 located in the first block 2.1 equipped with a module for wireless communication, see FIG. 2.

This audio loudspeaker 20 is preferably connected to an "all-in-one" type, "Multi-room" streaming player for sharing, streaming of music and radios independently in multiple ventilation units and in multiple rooms, wirelessly using applications in smartphones, tablets, watches or PCs. Independent streaming is possible via Wi-Fi, or direct playback via Bluetooth is possible, which is advantageous in terms of user comfort, due to the growing popularity of this system, without the need to install such device separately.

INDUSTRIAL APPLICABILITY

The device according to the present invention can be used for local ventilation of individual rooms with a high potential for heat recovery. The advantage is the easy adaptability of the ventilation unit to warmer and colder climatic conditions by simply replacing the central second block 2.2. The greatest potential for use is in cold regions, where exterior air temperatures reach values below freezing. The device enables year-round operation while ensuring high year-round heat recovery efficiency.

REFERENCE SIGNS LIST a—First channels
b—Second channels
A—First position (second block 2.2)
B—Second position (second block 2.2)
1—Thermal insulation housing of the unit
2.1—First block
2.2—Second block
2.3—Third block
3—Servo actuator
4—Supply fan
5—Exhaust fan
6—Supply diffuser
7—LED lighting
8—Internal unit cover
9.1—First contact surface
9.21—Second left contact surface
9.23—Second right contact surface
9.3—Third contact surface
10—Façade end element
11—Extract diffuser
12—Anchor plate
13—Flexible sealing sleeve
14—Heat recovery exchanger
15—Interior temperature and/or humidity sensor of the extract waste air
16—Indoor temperature and/or humidity sensor of the supply fresh air
17—Exterior temperature and/or humidity sensor of the exhaust waste air
18—Exterior temperature and/or humidity sensor of the intake fresh air
19—Internal insulating part for mounting fans and ducts
20—Loudspeakers
21—Supply air duct
22—Extract air duct
23—Intake air duct
24—Exhaust air duct
25—Second block 2.2 rotation axis
31—Pad (made of flexible airtight material)
51—Upper collecting part (of the condensate collector)
52—Lower collecting part (of the condensate collectors)
53—Condensate drain hose
60—Control unit
E—Clean air inlet from exterior
P—Clean air inlet to interior
I—Waste air outlet from interior
O—Waste air outlet to exterior

The invention claimed is:

1. A heat recovery ventilation unit for ventilating a building having at least one exterior wall, comprising:
a first block having an air interconnection to interior of the building;
a third block having an air interconnection to exterior of the building; and
a second block located between the first block and the third block, the second block comprising a heat recovery exchanger mechanically connected to the second block;
wherein the heat recovery exchanger comprises at least one first channel and at least one second channel;
wherein the at least one first channel is in thermal contact with the at least one second channel;
wherein for air interconnection to the exterior of the building, in the third block are installed an intake air duct for transporting fresh air from the exterior to the second block, and also an exhaust air duct, for the removal of waste air from the second block to the exterior;
wherein for air interconnection to the interior of the building, in the first block are located a supply air duct, for conveying fresh air from the second block to the interior, and also an extract air duct, for transporting waste air from the interior to the second block, this second block being rotatable and equipped with a drive for rotating the second block including the heat recovery exchanger, relative to the first block and relative to the third block, the rotation of the second block being adjustable to a first position in which the at least one first channel is air interconnected to the intake air duct by its second end and its first end to the supply air duct and in which the at least one second channel is air interconnected by its second end to the exhaust air duct- and by its first end to the extract air duct, and the rotation of the second block being also adjustable to a second position, in which the at least one second channel is air interconnected by its second end to the intake air duct and by its first end to the supply air duct and in which the at least one first channel is air interconnected by its second end to the exhaust air duct and by its first end to the extract air duct;
wherein the second block is positioned between the first block and the third block detachably;
wherein the drive consists of a servo actuator;
wherein to ensure the airtightness of all said air interconnections of the ends of the channels with the air ducts in both positions of the second block;
the first block on its side facing the second block is provided with a first contact surface having an inner and an outer face;
the third block on its side facing the second block is provided with a third contact surface having an inner and an outer face;
the second block on its side facing the first block is provided with a second left contact surface having an inner and an outer face; and
the second block on its side facing the third block is provided with a second right contact surface having an inner and an outer face;
wherein all contact surfaces are airtight and sliding and each of them is provided with at least two openings for the passage of at least two separate air streams; and
wherein at least one contact surface of the first contact surface and the second left contact surface is, on its inner face, supported by a first pad made of flexible airtight material, and also at least one contact surface of the second right contact surface and the third contact surface is, on its inner face, supported by a second pad made of flexible airtight material, the first block and the second block being connected to each other on their outer faces by pressing and the second block and the third block also being connected to each other on their outer faces by pressing.

2. The ventilation unit according to claim 1, wherein the servo actuator is located in the third block or in the first block; and
   wherein the servo actuator is provided with a coupling, the second block being freely slidable on this coupling.

3. The ventilation unit according to claim 1, further comprising a split condensate collector for draining condensed moisture from the heat recovery exchanger;
   wherein the split condensate collector comprises an upper collecting part with an upper inlet and an upper outlet, and a lower collecting part with a lower inlet and a lower outlet;
   wherein the upper collecting part is part of the second block and is rotatable together with the second block; and
   wherein the lower collecting part is located outside the second block in such manner that in one of the positions of the second block the lower inlet of the lower collecting part is below the upper outlet of the upper collecting part and also so that the lower outlet of the lower collecting part is connected to a condensate drain hose.

4. The ventilation unit according to claim 1, further comprising:
   a control unit for controlling the servo actuator and at least one interior temperature and/or humidity sensor located in the air ducts of the first block; and
   at least one exterior temperature and/or humidity sensor located in the air ducts of the third block;
   wherein the interior sensors, the exterior sensors and the servo actuator are connected to the control unit.

5. The ventilation unit according to claim 1, wherein the ventilation unit is shaped to be anchored in an installation opening penetrating the outer wall of the building.

6. The ventilation unit according to claim 1, wherein the second block is cylindrical; and
   wherein the third block is cylindrical or comprises sections of cylindrical shape.

7. The ventilation unit according to claim 5, wherein the third block comprises a façade end element through which the air interconnection of the third block to the exterior of the building passes;
   wherein the façade end element comprises an airtight partition for the directional separation of fresh and waste air,
   wherein the transverse external dimensions of the façade end element are smaller than the transverse dimensions of the installation opening penetrating the exterior wall of the building, for pushing the façade end element through the opening from the interior outwards; and
   wherein the façade end element is fitted with a flexible sealing sleeve on the outside to seal and cover a gap between the façade end element and the installation opening, the sealing sleeve being also a part of the third block.

8. The ventilation unit according to claim 1, further comprising LED lighting located in the first block.

9. The ventilation unit according to claim 1, further comprising at least one audio speaker located in the first block equipped with a module for wireless communication.

* * * * *